United States Patent
Izumi et al.

(10) Patent No.: US 12,161,989 B2
(45) Date of Patent: Dec. 10, 2024

(54) COBALT ION ADSORPTION MATERIAL AND METHOD FOR PRODUCING SAME

(71) Applicant: TITAN KOGYO KABUSHIKI KAISHA, Ube (JP)

(72) Inventors: Takeshi Izumi, Tokyo (JP); Takashi Sakuma, Tokyo (JP); Makoto Komatsu, Tokyo (JP); Hidenori Ishioka, Ube (JP); Takafumi Tanaka, Ube (JP); Nobuyuki Hashimoto, Ube (JP); Ayaka Ando, Ube (JP); Tomoko Yoshimi, Ube (JP)

(73) Assignee: TITAN KOGYO KABUSHIKI KAISHA, Ube (JP)

( * ) Notice: Subject to any disclaimer, the term of this patent is extended or adjusted under 35 U.S.C. 154(b) by 616 days.

(21) Appl. No.: 17/609,959

(22) PCT Filed: Apr. 7, 2020

(86) PCT No.: PCT/JP2020/015645
§ 371 (c)(1),
(2) Date: Nov. 9, 2021

(87) PCT Pub. No.: WO2020/230477
PCT Pub. Date: Nov. 19, 2020

(65) Prior Publication Data
US 2022/0176340 A1    Jun. 9, 2022

(30) Foreign Application Priority Data
May 10, 2019   (JP) .................................. 2019-089756

(51) Int. Cl.
*B01J 20/06*   (2006.01)
*B01J 20/28*   (2006.01)
*B01J 20/30*   (2006.01)
*G21F 9/12*   (2006.01)

(52) U.S. Cl.
CPC .........  *B01J 20/06* (2013.01); *B01J 20/28004* (2013.01); *B01J 20/28016* (2013.01); *B01J 20/3021* (2013.01); *B01J 20/3028* (2013.01); *B01J 20/3042* (2013.01); *B01J 20/3078* (2013.01); *B01J 20/3085* (2013.01); *G21F 9/12* (2013.01); *B01J 2220/42* (2013.01)

(58) Field of Classification Search
CPC .... B01J 20/046; B01J 20/06; B01J 20/28004; B01J 20/28016; B01J 20/2803; B01J 20/3021; B01J 20/3028; B01J 20/3042; B01J 20/3078; B01J 20/3085; B01J 2220/42; C02F 1/281; C02F 1/288; C02F 2101/006; C02F 2101/20; G21F 9/12; Y02P 10/20
See application file for complete search history.

(56) References Cited

U.S. PATENT DOCUMENTS

2013/0102458 A1*  4/2013  Wong ................... C01G 23/005
                                                                977/773

FOREIGN PATENT DOCUMENTS

| JP | S61138530 A | 6/1986 | |
|---|---|---|---|
| JP | 62-63899 A | 3/1987 | |
| JP | 2015042395 A | 3/2015 | |
| JP | 2015-188795 A | 11/2015 | |
| JP | 2017-070929 A | 4/2017 | |
| WO | WO-2016002755 A1 * | 1/2016 | .............. B01J 20/06 |
| WO | WO-2017081857 A1 * | 5/2017 | .............. B01J 20/06 |
| WO | 2018/163954 A1 | 9/2018 | |
| WO | 2019/093008 A1 | 5/2019 | |
| WO | 2020/050270 A1 | 3/2020 | |

OTHER PUBLICATIONS

Machine translation of WO 2016/002755. (Year: 2016).*
Machine translation of WO 2017/081857. (Year: 2017).*
European Extended Search Report for EP Patent Application No. 20805032.8 issued Jan. 2, 2023, 8 pages.
International Application No. PCT/JP2020/015645, International Search Report mailed Jun. 23, 2020, 2 pages.

* cited by examiner

*Primary Examiner* — Brian A McCaig
(74) *Attorney, Agent, or Firm* — COZEN O'CONNOR

(57) ABSTRACT

Provided are a cobalt ion adsorption material which has a large adsorption capacity and which tends not to generate fine powder, and a method for producing the same. This cobalt ion adsorption material is a powder with a particle diameter of 100-1,000 μm, and contains 0.3-8.0 parts by mass of a binder constituted of a water-insoluble metal oxide or metal hydroxide fine particles with respect to 100 parts by mass of a cobalt adsorption main agent constituted of potassium hydrogen dititanate hydrate.

6 Claims, No Drawings

COBALT ION ADSORPTION MATERIAL AND METHOD FOR PRODUCING SAME

This application is a national stage application of PCT/JP2020/015645 filed on Apr. 7, 2020, which claims priority to Japanese App. No. 2019-089756, filed on May 10, 2019, the entirety of which is incorporated herein by reference.

TECHNICAL FIELD

The present invention relates to a cobalt ion adsorption material that can be used in removing radioactive cobalt ions from an aqueous solution containing radioactive substances, and a production method thereof.

BACKGROUND ART

In recent years, with the accident at the Fukushima Daiichi Nuclear Power Plant, treatment of contaminated water containing radioactive substances has become a problem. Since radioactive substances cannot be chemically nullified, a method in which radioactive substances are adsorbed and collected using an ion adsorption material (hereinafter, referred to as "adsorption material") is effective for treating contaminated water including radioactive substances. However, since seawater and rainwater are mixed in the contaminated water and various substances are dissolved therein, the adsorption material needs to selectively adsorb the radioactive substances.

The main radioactive substances included in contaminated water are strontium-90 ($^{90}Sr$) and cesium-137 ($^{137}Cs$). The use of various alkali metal titanates as an adsorption material for radioactive strontium has been proposed.

On the other hand, when cleanup of an accident becomes prolonged, treatment of radioactive cobalt in the contaminated water becomes a new problem. Cobalt-60 ($^{60}Co$) is the product of nuclear fission produced by neutron capture in cobalt-59 ($^{59}Co$). Due to the high temperature around the reactor, cobalt-59 elutes little by little from the piping into the water, and changes to cobalt-60 due to the influence of the surrounding radioactive substances. Cobalt-60 undergoes beta decay to nickel-60, and the decay product nickel-60 undergoes gamma decay to emit 1.17 MeV and 1.33 MeV gamma rays. These gamma rays have high transmittance and a large amount of energy, and thus are a strong source of radiation exposure. Cobalt-60 is also mixed in the contaminated water at the accident site of the Fukushima Daiichi Nuclear Power Plant. Even after recovering strontium-90 and cesium-137 in the contaminated water using an adsorption material, the treatment of the contaminated water is not complete because cobalt-60 remains in the contaminated water.

Patent Literature 1 describes a treatment apparatus and a treatment method for cobalt-containing water, in which a titanate represented by the chemical formula $M_2Ti_2O_5$ is used.

Patent Literature 1 states that a granulated body is produced using titanate powder as primary particles, and at that time, it is preferable to add 0.1 to 0.5 parts by mass of a binder, such as a clay mineral, with respect to 1.0 part by mass of titanate. The adsorption material described in Patent Literature 1 contains a large amount of substances such as clay minerals and silicate compounds that do not contribute to the adsorption of cobalt-60, and the adsorption capacity per unit volume is small. In addition, it is stated preferable to perform calcination after granulation in order to obtain the strength of the adsorption material, which increases the energy cost relating to production.

CITATION LIST

Patent Literature

PTL 1: Japanese Patent Laid-Open No. 2017-070929

SUMMARY OF INVENTION

Technical Problem

An object of the present invention is to provide a cobalt ion adsorption material which has a large adsorption capacity, is less likely to generate fine powder, and is suitable for decontamination of a liquid containing radioactive cobalt ions, and a production method thereof.

Solution to Problem

As a result of diligent studies to solve the above-described problems, the present inventors discovered that a cobalt ion adsorption material suitable for decontamination of a liquid containing radioactive cobalt ions, which has excellent cobalt ion adsorption performance, less generation of fine powder, and excellent handleability as a water treatment material could be obtained by using a potassium hydrogen dititanate hydrate represented by the chemical formula $K_{2-x}H_xO \cdot 2TiO_2 \cdot nH_2O$ (wherein, x is 0.1 or more and 1.8 or less, and n is greater than 0) as a main agent of cobalt ion adsorption, adding a fine particle of a water-insoluble metal oxide or metal hydroxide as a binder and mixing the resultant, and further granulating and drying the resultant mixture.

The present invention includes the following modes.

[Mode 1]

A particulate cobalt ion adsorption material comprising 0.3 parts by mass or more and 8.0 parts by mass or less of a binder consisting of fine particles of a water-insoluble metal oxide or metal hydroxide with respect to 100 parts by mass of a cobalt ion adsorption main agent consisting of potassium hydrogen dititanate hydrate, wherein the particulate cobalt ion adsorption material has a particle size of 100 μm or more and 1000 μm or less.

[Mode 2]

The cobalt ion adsorption material according to mode 1, wherein the potassium hydrogen dititanate hydrate is represented by the chemical formula $K_{2-x}H_xO \cdot 2TiO_2 \cdot nH_2O$ (wherein, x is 0.1 or more and 1.8 or less, and n is greater than 0), and the potassium hydrogen dititanate hydrate has a median diameter of 0.5 μm or more and 3.0 μm or less.

[Mode 3]

The cobalt ion adsorption material according to mode 1 or 2, wherein the fine particles of the metal oxide or metal hydroxide has an average minor axis length of 0.01 μm or more and 0.30 μm or less.

[Mode 4]

The cobalt ion adsorption material according to any one of modes 1 to 3, wherein the fine particles of the metal oxide or metal hydroxide has shape anisotropy, and an axial ratio obtained by dividing an average major axis length by the average minor axis length of 3 or more and 100 or less.

[Mode 5]

A method for producing the cobalt ion adsorption material according to any one of modes 1 to 4, the method comprising:

hydrating potassium dititanate represented by the chemical formula $K_2O \cdot 2TiO_2$ and performing cation exchange between potassium ions ($K^+$) and protons ($H^+$) to obtain a potassium hydrogen dititanate hydrate represented by the chemical formula $K_{2-x}H_xO \cdot 2TiO_2 \cdot nH_2O$ (wherein, x is 0.1 or more and 1.8 or less, and n is greater than 0); and adding, as a binder, 0.3 parts by mass or more and 8.0 parts by mass or less of fine particles of a metal oxide or metal hydroxide that is water-insoluble and has shape anisotropy with respect to 100 parts by mass of potassium hydrogen dititanate hydrate to perform granulation.

[Mode 6]

The method according to mode 5, comprising the steps of:
(1) mixing a titanium source and a potassium source;
(2) calcining the obtained mixture to obtain potassium dititanate;
(3) bringing the potassium dititanate into contact with water to form a slurry, and hydrating the potassium dititanate to perform cation exchange between potassium ions and protons to obtain the potassium hydrogen dititanate hydrate ($K_{2-x}H_xO \cdot 2TiO_2 \cdot nH_2O$, wherein x is 0.1 or more and 1.8 or less, and n is greater than 0);
(4) wet-grinding the obtained potassium hydrogen dititanate hydrate ($1(2-xH_xO \cdot 2TiO_2 \cdot nH_2O$, wherein x is 0.1 or more and 1.8 or less, and n is greater than 0) in a slurry;
(5) adding fine particles of a water-insoluble metal or metal hydroxide as a binder to the slurry so that a concentration of the binder becomes 0.3 parts by mass or more and 8.0 parts by mass or less with respect to 100 parts by mass of the potassium hydrogen dititanate hydrate, stirring, and mixing;
(6) subjecting the slurry to solid-liquid separation to obtain a filtered cake containing the potassium hydrogen dititanate hydrate and the binder;
(7) granulating the filtered cake;
(8) drying the particles obtained by granulation at a temperature of 60° C. or higher and 150° C. or lower for 1 hour or more and 24 hours or less; and
(9) crushing and sizing the dried granulated particles to obtain a particulate cobalt ion adsorption material having a particle size range of 100 μm or more and 1000 μm or less.

Advantageous Effects of Invention

According to the present invention, by using potassium hydrogen dititanate hydrate represented by the chemical formula $K_{2-x}H_xO \cdot 2TiO_2 \cdot nH_2O$ as an adsorption main agent, and adding 0.3 parts by mass or more and 8.0 parts by mass or less of a water-insoluble metal oxide or metal hydroxide fine particle as a binder with respect to 100 parts by mass of the adsorption main agent and mixing the resultant, then granulating and drying the resultant mixture, mechanical strength can be improved without harming the adsorption performance of the adsorption main agent, and the occurrence of fine powder can be prevented. Since the adsorption material has an excellent adsorption capacity, a replacement frequency of the adsorption material can be reduced, the actual operating rate can be improved, and the radiation dose in the replacement operation can be reduced. Further, since blockage due to fine powder in the water flow path between the adsorption tower strainer and the adsorption material does not occur, increase in the differential pressure is suppressed. In addition, it is possible to prevent fine powder containing a radioactive substance from leaking into the outside environment from a container filled with the adsorption material.

When decontaminating radioactive cobalt-containing water with the present cobalt ion adsorption material, radioactive substances other than radioactive cobalt, such as strontium-90, may be adsorbed at the same time.

DESCRIPTION OF EMBODIMENTS

Hereinafter, an embodiment of the present invention will be described in detail, but the embodiment described below is for facilitating an understanding of the present invention and does not limit the present invention in any way. The present invention can be implemented by variously modifying each element disclosed in the following embodiment as long as the gist of the present invention is not exceeded.

The cobalt ion adsorption material of the present invention is characterized by containing potassium hydrogen dititanate hydrate, which is a main agent for cobalt ion adsorption, and water-insoluble metal oxide or metal hydroxide fine particles, which is a binder. The potassium hydrogen dititanate hydrate is preferably represented by the chemical formula $K_{2-x}H_xO \cdot 2TiO_2 \cdot nH_2O$ (wherein x is 0.1 or more and 1.8 or less, and n is greater than 0).

The potassium dititanate hydrate used as the main agent for adsorbing cobalt ions in the present invention can be obtained by hydrating potassium dititanate and causing cation exchange between the potassium ions and protons. This potassium dititanate hydrate generally has the chemical formula $K_{2-x}H_xO \cdot 2TiO_2 \cdot nH_2O$. Here, when x becomes larger than 1.8, cleavage of the layer composed of the $TiO_5$ trigonal bipyramid tends to occur, and the strength of the potassium hydrogen titanate hydrate crystal itself is lowered, so that even if a binder is added, it is difficult to improve the mechanical strength of the cobalt ion adsorption material. Further, when x is smaller than 0.1, the adsorption performance deteriorates. Accordingly, x is preferably 0.1 or more and 1.8 or less. When x is 0.1 or more and 1.8 or less, the interlayer distance becomes wide, and a cobalt ion adsorption performance is more likely to be exhibited. The state of hydration, that is, the value of n, is not limited, but usually n is greater than 0 and less than or equal to 2.

It is desirable that the potassium hydrogen dititanate hydrate represented by the chemical formula $K_{2-x}H_xO \cdot 2TiO_2 \cdot nH_2O$ (wherein x is 0.1 or more and 1.8 or less, and n is larger than 0) used in the present invention has a median diameter in the wet-ground slurry before granulation of 0.50 μm or more and 3.00 μm or less. When the median diameter is 0.50 μm or more, the difference in particle size from the water-insoluble metal oxide or metal hydroxide fine particle, which is a binder, is not too small, and the effect of the binder on improving the strength of the granulated body is more easily obtained. Further, when the median diameter is 3.00 μm or less, the fine structures where the particles are in contact or near each other are sufficiently formed, and the effect of the binder on improving the strength of the granulated body is more easily obtained.

The median diameter of the potassium hydrogen dititanate hydrate can be measured by the following method.

A laser light diffraction and scattering type particle size analyzer Microtrack MT3300 manufactured by Microtrack Bell Co., Ltd. is used for the measurement. Ion-exchanged water is used as the dispersion medium to prepare a slurry. The concentration of the slurry is adjusted in the measuring device so that the diffracted light intensity and the scattered light intensity are within an appropriate range. An appropriate amount of the slurry is added dropwise into the ultrasonic dispersion tank of the automatic sample circulator attached to the measuring device, and ultrasonic dispersion is performed at an output of 40 W for 300 seconds. After that, the median diameter (d50) is measured twice by setting the measurement time to 30 seconds, setting a refractive index of the ion-exchanged water to 1.33 and setting a light transmittance of the particle to be measured to absorption. The average value of the two measurements is taken as the median diameter (d50) of the potassium hydrogen dititanate hydrate.

The metal oxide or metal hydroxide fine particle used as a binder in the present invention is a water-insoluble particle. Water-insoluble means that the particle has low solubility in water, and when the particle is mixed with water at normal temperature and pressure, the particle does not dissolve in water and retains its shape. Further, the metal oxide or metal hydroxide fine particle is preferably a shape-anisotropic particle. Shape-anisotropic means that the shape differs depending on the direction, such that one axis is longer or shorter than the other axis. Examples of shape-anisotropic include needle-shaped, thin-plate-shaped, spindle-shaped, fan-shaped, strip-shaped, and the like. In contrast, a uniform shape in each direction, such as a sphere, or a shape close to a uniform shape in each direction, such as a cube or an octahedron, is not shape-anisotropic. When the binder fine particle is shape-anisotropic, the in-water strength of the cobalt ion adsorption material containing the binder is further improved.

It is preferable that the fine particle used as the binder generally has an average minor axis length that is smaller than the median diameter of the potassium hydrogen dititanate hydrate, which is the main agent for adsorption of cobalt ions. The average minor axis length is preferably 0.010 μm or more and 0.300 μm or less. The axial ratio obtained by dividing the average major axis length by the average minor axis length is preferably 3 or more and 100 or less. When the average minor axis length and the axial ratio are within the above ranges, the effect of improving strength is enhanced, and the adsorption performance of cobalt ions is further improved.

The average minor axis length and axial ratio of the metal oxide or metal hydroxide fine particle (binder) can be measured by the following method.

From transmission electron micrographs of each binder, the minor axis length and the major axis length are measured for 50 or more particles using a Carl Zeiss Particle Size Analyzer, and the average minor axis length and the average major axis length are determined. The axial ratio is calculated by dividing the average major axis length by the average minor axis length.

The particulate cobalt ion adsorption material of the present invention can be produced by: (1) mixing a titanium source and a potassium source; (2) calcining the obtained mixture to obtain potassium dititanate; (3) bringing the potassium dititanate into contact with water to form a slurry, hydrating the potassium dititanate and causing cation exchange between potassium ions and protons to obtain the potassium hydrogen dititanate hydrate ($K_{2-x}H_xO \cdot 2TiO_2 \cdot nH_2O$, wherein x is 0.1 or more and 1.8 or less, and n is greater than 0); (4) wet-grinding the obtained potassium hydrogen dititanate hydrate ($K_{2-x}H_xO \cdot 2TiO_2 \cdot nH_2O$, wherein x is 0.1 or more and 1.8 or less, and n is greater than 0) in a slurry; (5) adding, stirring, and mixing fine particles of a water-insoluble metal oxide or metal hydroxide as a binder to the slurry; (6) subjecting the slurry to solid-liquid separation to obtain a filtered cake containing the potassium hydrogen dititanate hydrate and the binder; (7) granulating the filtered cake; and (8) crushing and sizing the dried granulated particles to obtain a cobalt ion adsorption material having a particle size range of 100 μm or more and 1000 μm or less.

Potassium hydrogen dititanate hydrate represented by the chemical formula $K_{2-x}H_xO \cdot 2TiO_2 \cdot nH_2O$ (wherein x is 0.1 or more and 1.8 or less, and n is greater than 0) can be obtained by dissolving ilmenite ore by a sulfuric acid method, mixing a potassium source such as potassium carbonate, potassium hydrogen carbonate, potassium hydroxide, or potassium oxide with the obtained metatitanic acid slurry, drying, calcining, mixing the obtained potassium dititanate ($K_2O \cdot 2TiO_2$) with water, and causing hydration and cation exchange reaction between the potassium ions ($K^+$) and protons ($H^+$).

By adding fine particles of a water-insoluble metal oxide or metal hydroxide as a binder to the potassium hydrogen dititanate hydrate, a particulate adsorption material having excellent mechanical strength can be obtained without causing a deterioration in the adsorption performance of the cobalt ions of the potassium hydrogen dititanate hydrate as an adsorption main agent.

Hereinafter, the method for producing the cobalt ion adsorption material of the present invention will be described for each process.

[Raw Materials]

As the titanium source used in the present invention, titanium dioxide, titanium suboxide, orthotitanic acid or a salt thereof, metatitanic acid or a salt thereof, titanium hydroxide, and the like can be used alone or in combination of two or more. In particular, metatitanic acid can be preferably used. Metatitanic acid is cheaper than a calcined product because it is obtained as a slurry after dissolving titanium ore such as ilmenite with sulfuric acid and hydrolyzing. In addition, metatitanic acid is finer than a calcined product, and therefore has excellent mixability and reactivity with the potassium source.

As the potassium source, potassium carbonate, potassium hydroxide, potassium oxalate, and the like can be used alone or in combination of two or more. As the potassium source, a material that melts in the calcining reaction is preferable, and a carbonate is particularly preferable. Potassium carbonate is preferable because it melts or decomposes in the calcining reaction with the titanium source, which means that the reaction tends to occur, and even after decomposition, no by-products are produced except for chemically inert carbon dioxide.

As the binder source, any water-insoluble metal oxide or metal hydroxide fine particle can be used without any particular restriction, and the binder source can be selected in consideration of cost, availability, impact on living organisms and the environment, and the like. Examples of typical metal oxides or metal hydroxides include iron oxide, iron oxyhydroxide, titanium oxide, titanium oxyhydroxide, aluminum oxide, aluminum hydroxide, zinc oxide, and the like. Iron oxide includes diiron trioxide, triiron tetraoxide, and the like, and also includes ferrites such as magnesium ferrite and zinc ferrite. These metal oxides or metal hydroxides are preferable because they are naturally or industrially produced, are abundantly supplied, are easily available, and have little impact on living organisms and the environment.

[Mixing]

The mixing ratio of the titanium source and the potassium source is preferably 0.95 mol or more and 1.25 mol or less of K with respect to 1 mol of Ti. If the ratio of K to 1 mol of Ti is less than 0.95 mol, the amount of impurities such as potassium tetratitanate may increase, and if the ratio of K to 1 mol of Ti is larger than 1.25 mol, excess potassium may remain without producing potassium titanate. In either case, the cation exchange capacity becomes decreases, and the adsorption capacity of the cobalt ions deteriorates. In the present application, for the composition analysis of the particles, values measured by an inductively coupled plasma mass spectrometer ICP-Mass (Agilent 7700x ICP-MS, manufactured by Agilent Technologies, Inc.) are used. The mixing of the titanium source and the potassium source can be carried out by dry mixing using solids for both raw materials, or by wet mixing using a sludge (slurry) or an aqueous solution for one raw material or both raw materials.

When dry mixing is performed, the obtained mixture can be calcined as it is. When wet mixing is performed, the mixed slurry of the titanium source and the potassium source is dried by an appropriate method and then calcined. In order to easily and efficiently dry the mixed slurry, granulation may be performed before drying. As the granulation method from the slurry, a normal granulation method (for example, a method of extruding a highly viscous slurry from a perforated plate) can be used without limitation. A type of the drying device and a heat source for drying are not particularly limited, but when the drying time is long, water-soluble potassium moves from the inside of the bulk to the surface of the bulk as the water moves, resulting in an unbalance in the Ti/K molar ratio. Therefore, a spray drying method having a short drying time is preferable.

[Calcination]

Potassium dititanate is obtained by calcining the mixture of the titanium source and the potassium source. The calcination temperature and the calcination time are not particularly limited, but it is preferable to hold at a temperature in the range of 700° C. or higher and 850° C. or lower for 1 hour or more and 24 hours or less. The rate of temperature increase and decrease are not particularly limited, but usually are preferably 3° C./min or more and 8° C./min or less.

[Crushing and Slurry Formation]

It is preferable to crush the calcined product in order to facilitate slurry (sludge) formation of the obtained calcined product and the wet grinding in the next step. The crushing can be performed by using ordinary crushing means, for example, a grinding machine, an edge runner mill, a hammer mill, an air flow mill, a high-speed stirring mill, a twin roll type mill, and the like. After crushing the calcined product, water is added to the crushed product to form a slurry (sludge). Due to the formation of the slurry (sludge), hydration and cation exchange between the potassium ions and protons occur in the potassium dititanate, thereby potassium hydrogen dititanate hydrate represented by $K_{2-x}H_xO \cdot 2TiO_2 \cdot nH_2O$ (wherein x is 0.1 or more and 1.8 or less, and n is greater than 0) is formed.

[Wet Grinding]

The slurry (sludge) obtained by the above-described crushing and slurry-formation is subjected to wet-grinding. However, if excessive wet grinding is performed, the particles become too fine, and the mechanical strength of the final adsorption material deteriorates. Therefore, an appropriate level of wet grinding is performed. The potassium hydrogen dititanate hydrate in the wet-ground slurry has a median diameter of preferably 0.50 μm or more and 3.00 μm or less. The wet grinding can be carried out using any normal wet grinding method, such as a bead mill or a high-pressure homogenizer. The conditions for the wet grinding can be appropriately selected according to the properties of the potassium hydrogen dititanate hydrate in the slurry and the treatment conditions after the wet grinding.

[Mixing of Binder]

The fine particle of the metal oxide or metal hydroxide to serve as a binder is added to the slurry (sludge) obtained by the above wet grinding, stirred, and mixed with the potassium hydrogen dititanate hydrate. The metal oxide or the metal hydroxide may be added in a solid state (dry state), or may be added in a slurry (sludge) state by stirring and mixing with water in advance. Alternatively, if the metal oxide or metal hydroxide strongly aggregates and does not easily uniformly mix with the potassium hydrogen dititanate hydrate by simple stirring, the metal oxide or metal hydroxide may be added during the crushing and slurry-forming step of the potassium hydrogen dititanate hydrate, and may be wet-ground together with the potassium hydrogen dititanate hydrate in the wet grinding step.

[Filtration]

The wet-ground slurry (sludge) is subjected to solid-liquid separation using an appropriate filtration device. The filtration device is not particularly limited, and a normal filtration device, for example, a vacuum filtration device, a press-type filtration device, or the like can be used. Considering the ease of granulation, the water content of the filtered cake is preferably 35% by mass or more and 50% by mass or less.

[Granulation]

The obtained filtered cake is granulated. As the granulation method, the filtered cake may be directly extruded and granulated (wet granulation), or the filtered cake may be dried and then the lumpy dried product may be ground and sized (dry granulation). As the extrusion granulation apparatus, a screw type extrusion granulation machine, a roll type extrusion granulation machine, a blade type extrusion granulation machine, a self-molding type extrusion granulation machine, and the like can be used.

[Drying]

There are no particular restrictions on the drying device or on the heat source used when drying the filtered cake during dry granulation or when drying the granulated body obtained by wet granulation; but the drying is preferably carried out at a temperature of 60° C. or higher and 150° C. or lower for 1 hour or more and 24 hours or less. Heating reduces the interlayer distance of the product. The interlayer distance affects the ion exchange capacity. Therefore, it is preferable to strictly control the temperature.

[Crushing and Sizing]

The cobalt ion adsorption material is obtained by crushing the granulated body obtained by dry granulation or the granulated body obtained by wet granulation followed by drying, and optionally sizing the crushed material with a classifier to adjust the particle size to 100 μm or more and 1000 μm or less, and more preferably to 150 μm or more and 600 μm or less. When the particle size after sizing is within the above range, it is easy to maintain the filling volume in an adsorption tower or the like within a suitable range, and there is little possibility that the adsorption tower is blocked.

EXAMPLES

Hereinafter, the present invention will be described in more detail with reference to Examples and Comparative Examples. Examples given below are provided for illustration purposes only and do not limit the scope of the invention.

Synthesis Example: Synthesis of Potassium Dititanate 15.75 kg of potassium carbonate (manufactured by Asahi Glass) was dissolved in a metatitanic acid slurry including 14.75 kg of Ti in terms of titanium oxide to prepare a raw material mixture slurry. The raw material mixture slurry was spray-dried to obtain a mixed dry product including a titanium source and a potassium source.

2 kg of the obtained mixed dry product was filled in 2 calcination pots, with 1 kg in each pot, and calcined in an electric furnace at a temperature of 770° C. for 6 hours. The obtained calcined product was crushed using a hammer mill. The obtained powder was identified by an X-ray diffractometer (RINT-TTRIII, manufactured by Rigaku Corporation) as having the same peak as potassium dititanate having a chemical formula $K_2O \cdot 2TiO_2$. The average particle size of the primary particles of the powder measured using a scanning electron microscope was 1.0 μm, and the average particle size of the secondary particles was 15 μm.

Example 1: Production of Cobalt Ion Adsorption Material 400 g of the potassium dititanate powder obtained in Synthesis Example was added to (rehydrated in) 2 L of water to prepare a slurry (form a sludge). This slurry was subjected to wet-grinding twice. The median diameter (d50) of the potassium hydrogen dititanate hydrate after the wet grinding was 0.98 μm, and x, when the potassium hydrogen dititanate hydrate is represented by the chemical formula $K_{2-x}H_xO \cdot 2TiO_2 \cdot nH_2O$, was 1.1.

2 g of needle-shaped α-type iron oxyhydroxide having an average minor axis length of 0.070 μm and an axial ratio of 10 was added to the wet-ground slurry, and the mixture was stirred and mixed.

Next, the slurry was filtered by a vacuum filtration method to obtain a filtered cake. The obtained filtered cake was dried at a temperature of 110° C. for 15 hours, and then crushed and sized by a sieve to a particle size range of 300 μm or more and 600 μm or less to obtain a cobalt ion adsorption material having a particle size of 300 μm or more and 600 μm or less.

Example 2: Production of Cobalt Ion Adsorption Material 400 g of the potassium dititanate powder obtained in Synthesis Example was added to (rehydrated in) 2 L of water to prepare a slurry (form a sludge). This slurry was subjected to wet-grinding twice. The d50 of the potassium hydrogen dititanate hydrate after the wet grinding was 0.98 μm, and x, when the potassium hydrogen dititanate hydrate is represented by the chemical formula $K_{2-x}H_xO \cdot 2TiO_2 \cdot nH_2O$, was 1.2.

20 g of needle-shaped α-type iron oxyhydroxide having an average minor axis length of 0.070 μm and an axial ratio of 10 was added to the wet-ground slurry, and the mixture was stirred and mixed.

Next, the slurry was filtered using a press-type filter to obtain a filtered cake. The obtained filtered cake was granulated using an extrusion machine, dried at a temperature of 110° C. for 15 hours, and then crushed and sized by a sieve to a particle size range of 100 μm or more and 600 μm or less to obtain a cobalt ion adsorption material having a particle size of 100 lam or more and 600 μm or less.

Example 3: Production of Cobalt Ion Adsorption Material 3000 g of the potassium dititanate powder obtained in Synthesis Example and 15 g of sodium polyacrylate as a dispersant were added to (rehydrated in) 2 L of water to prepare a slurry (form a sludge). This slurry was subjected to wet-grinding twice. The d50 of the potassium hydrogen dititanate hydrate after the wet grinding was 0.55 μm, and x, when the potassium hydrogen dititanate hydrate is represented by the chemical formula $K_{2-x}H_xO \cdot 2TiO_2 \cdot nH_2O$, was 0.1.

15 g of needle-shaped α-type iron oxyhydroxide having an average minor axis length of 0.070 μm and an axial ratio of 10 was added to the wet-ground slurry, and the mixture was stirred and mixed.

Next, the slurry was filtered using a press-type filter to obtain a filtered cake. The obtained filtered cake was granulated using an extrusion machine, dried at a temperature of 110° C. for 15 hours, and then crushed and sized by a sieve to a particle size range of 100 μm or more and 600 μm or less to obtain a cobalt ion adsorption material having a particle size of 100 lam or more and 600 μm or less.

Example 4: Production of Cobalt Ion Adsorption Material 100 g of the potassium dititanate powder obtained in Synthesis Example was added to (rehydrated in) 2 L of water to prepare a slurry (form a sludge). This slurry was subjected to wet-grinding twice. The d50 of the potassium hydrogen dititanate hydrate after the wet grinding was 2.56 μm, and x, when the potassium hydrogen dititanate hydrate is represented by the chemical formula $K_{2-x}H_xO \cdot 2TiO_2 \cdot nH_2O$, was 1.8.

7 g of needle-shaped α-type iron oxyhydroxide having an average minor axis length of 0.070 μm and an axial ratio of 10 was added to the wet-ground slurry, and the mixture was stirred and mixed.

Next, the slurry was filtered using a press-type filter to obtain a filtered cake. The obtained filtered cake was granulated using an extrusion machine, dried at a temperature of 110° C. for 15 hours, and then crushed and sized by a sieve to a particle size range of 300 μm or more and 600 μm or less to obtain a cobalt ion adsorption material having a particle size of 300 lam or more and 600 μm or less.

Example 5: Production of Cobalt Ion Adsorption Material 400 g of the potassium dititanate powder obtained in Synthesis Example was added to (rehydrated in) 2 L of water to prepare a slurry (form a sludge). This slurry was subjected to wet-grinding twice. The d50 of the potassium hydrogen dititanate hydrate after the wet grinding was 0.98 μm, and x, when the potassium hydrogen dititanate hydrate is represented by the chemical formula $K_{2-x}H_xO \cdot 2TiO_2 \cdot nH_2O$, was 1.0.

2 g of needle-shaped γ-type iron oxyhydroxide having an average minor axis length of 0.070 μm and an axial ratio of 30 was added to the wet-ground slurry, and the mixture was stirred and mixed.

Next, the slurry was filtered using a press-type filter to obtain a filtered cake. The obtained filtered cake was granulated using an extrusion machine. Water was sprayed in an amount corresponding to 3% by mass of the obtained granulated product, the sprayed granulated product was then dried at a temperature of 110° C. for 15 hours, and then crushed and sized by a sieve to a particle size range of 150 μm or more and 300 μm or less to obtain a cobalt ion adsorption material having a particle size of 150 μm or more and 300 μm or less.

Example 6: Production of Cobalt Ion Adsorption Material 1200 g of the potassium dititanate powder obtained in Synthesis Example was added to (rehydrated in) 2 L of water to prepare a slurry (form a sludge). This slurry was subjected to wet-grinding twice. The d50 of the potassium hydrogen dititanate hydrate after the wet grinding was 0.69 μm, and x, when the potassium hydrogen dititanate hydrate is represented by the chemical formula $K_{2-x}H_xO \cdot 2TiO_2 \cdot nH_2O$, was 0.6.

60 g of needle-shaped γ-type iron oxyhydroxide having an average minor axis length of 0.070 μm and an axial ratio of 30 was added to the wet-ground slurry, and the mixture was stirred and mixed.

Next, the slurry was filtered using a press-type filter to obtain a filtered cake. The obtained filtered cake was granulated using an extrusion machine. Water was sprayed in an amount corresponding to 3% by mass of the obtained granulated product, the sprayed granulated product was then dried at a temperature of 110° C. for 15 hours, and then crushed and sized by a sieve to a particle size range of 300 μm or more and 1000 μm or less to obtain a cobalt ion adsorption material having a particle size of 300 μm or more and 1000 μm or less.

Example 7: Production of Cobalt Ion Adsorption Material 400 g of the potassium dititanate powder obtained in Synthesis Example was added to (rehydrated in) 2 L of water to prepare a slurry (form a sludge). This slurry was subjected to wet-grinding twice. The d50 of the potassium hydrogen dititanate hydrate after the wet grinding was 0.98 μm, and x, when the potassium hydrogen dititanate hydrate is represented by the chemical formula $K_{2-x}H_xO \cdot 2TiO_2 \cdot nH_2O$, was 1.2.

20 g of spindle-shaped rutile-type titanium dioxide having an average minor axis length of 0.025 μm and an axial ratio of 4 was added to the wet-ground slurry, and the mixture was stirred and mixed.

Next, the slurry was filtered using a press-type filter to obtain a filtered cake. The obtained filtered cake was granulated using an extrusion machine, dried at a temperature of 110° C. for 15 hours, and then crushed and sized by a sieve to a particle size range of 100 μm or more and 600 μm or less to obtain a cobalt ion adsorption material having a particle size of 100 lam or more and 600 μm or less.

Example 8: Production of Cobalt Ion Adsorption Material 400 g of the potassium dititanate powder obtained in Synthesis Example was added to (rehydrated in) 2 L of water to prepare a slurry (form a sludge). This slurry was subjected to wet-grinding once. The d50 of the potassium hydrogen dititanate hydrate after the wet grinding was 1.53 μm, and x, when the potassium hydrogen dititanate hydrate is represented by the chemical formula $K_{2-x}H_xO \cdot 2TiO_2 \cdot nH_2O$, was 1.2.

12 g of strip-shaped titanium oxyhydroxide having an average minor axis length of 0.035 lam and an axial ratio of 3 was added to the wet-ground slurry, and the mixture was stirred and mixed.

Next, the slurry was filtered using a press-type filter to obtain a filtered cake. The obtained filtered cake was granulated using an extrusion machine, dried at a temperature of 110° C. for 15 hours, and then crushed and sized by a sieve to a particle size range of 300 μm or more and 600 μm or less to obtain a cobalt ion adsorption material having a particle size of 300 lam or more and 600 μm or less.

Example 9: Production of Cobalt Ion Adsorption Material 400 g of the potassium dititanate powder obtained in Synthesis Example was added to (rehydrated in) 2 L of water to prepare a slurry (form a sludge). This slurry was subjected to wet-grinding twice. The d50 of the potassium hydrogen dititanate hydrate after the wet grinding was 0.98 μm, and x, when the potassium hydrogen dititanate hydrate is represented by the chemical formula $K_{2-x}H_xO \cdot 2TiO_2 \cdot nH_2O$, was 1.1.

4 g of needle-shaped α-type diiron trioxide having an average minor axis length of 0.070 lam and an axial ratio of 10 was added to the wet-ground slurry, and the mixture was stirred and mixed.

Next, the slurry was filtered by a vacuum filtration method to obtain a filtered cake. The obtained filtered cake was dried at a temperature of 110° C. for 15 hours, and then crushed and sized by a sieve to a particle size range of 300 μm or more and 600 μm or less to obtain a cobalt ion adsorption material having a particle size of 300 μm or more and 600 μm or less.

Example 10: Production of Cobalt Ion Adsorption Material 400 g of the potassium dititanate powder obtained in Synthesis Example was added to (rehydrated in) 2 L of water to prepare a slurry (form a sludge). This slurry was subjected to wet-grinding twice. The d50 of the potassium hydrogen dititanate hydrate after the wet grinding was 0.98 μm, and x, when the potassium hydrogen dititanate hydrate is represented by the chemical formula $K_{2-x}H_xO \cdot 2TiO_2 \cdot nH_2O$, was 1.1.

20 g of thin-plate-shaped triiron tetraoxide having an average minor axis length of 0.200 lam and an axial ratio of 80 was added to the wet-ground slurry, and the mixture was stirred and mixed.

Next, the slurry was filtered by a vacuum filtration method to obtain a filtered cake. The obtained filtered cake was dried at a temperature of 110° C. for 15 hours, and then crushed and sized by a sieve to a particle size range of 300 μm or more and 600 μm or less to obtain a cobalt ion adsorption material having a particle size of 300 μm or more and 600 μm or less.

Example 11: Production of Cobalt Ion Adsorption Material 400 g of the potassium dititanate powder obtained in Synthesis Example was added to (rehydrated in) 2 L of water to prepare a slurry (form a sludge). This slurry was subjected to wet-grinding twice. The d50 of the potassium hydrogen dititanate hydrate after the wet grinding was 0.98 μm, and x, when the potassium hydrogen dititanate hydrate is represented by the chemical formula $K_{2-x}H_xO \cdot 2TiO_2 \cdot nH_2O$, was 1.1.

12 g of the needle-shaped magnesium ferrite represented by the chemical formula $MgFe_3O_4$ having an average minor axis length of 0.200 μm and an axial ratio of 5 was added to the wet-ground slurry, and the mixture was stirred and mixed.

Next, the slurry was filtered by a vacuum filtration method to obtain a filtered cake. The obtained filtered cake was dried at a temperature of 110° C. for 15 hours, and then crushed and sized by a sieve to a particle size range of 300 μm or more and 600 μm or less to obtain a cobalt ion adsorption material having a particle size of 300 μm or more and 600 μm or less.

Comparative Example 1: Production of Cobalt Ion Adsorption Material (Binder not Used)

400 g of the potassium dititanate powder obtained in Synthesis Example was added to (rehydrated in) 2 L of water to prepare a slurry (form a sludge). This slurry was subjected to wet-grinding twice. The d50 of the potassium hydrogen dititanate hydrate after the wet grinding was 0.98 μm, and x, when the potassium hydrogen dititanate hydrate is represented by the chemical formula $K_{2-x}H_xO \cdot 2TiO_2 \cdot nH_2O$, was 1.1.

Next, the slurry was filtered by a vacuum filtration method to obtain a filtered cake. The obtained filtered cake was dried at a temperature of 110° C. for 15 hours, and then crushed and sized by a sieve to a particle size range of 300 μm or more and 600 μm or less to obtain a cobalt ion adsorption material having a particle size of 300 μm or more and 600 μm or less.

Comparative Example 2: Production of Cobalt Ion Adsorption Material (Binder not Used)

400 g of the potassium dititanate powder obtained in Synthesis Example was added to (rehydrated in) 2 L of water to prepare a slurry (form a sludge). This slurry was subjected to wet-grinding twice. The d50 of the potassium hydrogen dititanate hydrate after the wet grinding was 0.98 μm, and x, when the potassium hydrogen dititanate hydrate is represented by the chemical formula $K_{2-x}H_xO \cdot 2TiO_2 \cdot nH_2O$, was 1.2.

Next, the slurry was filtered using a press-type filter to obtain a filtered cake. The obtained filtered cake was granulated using an extrusion machine, dried at a temperature of 110° C. for 15 hours, and then crushed and sized by a sieve to a particle size range of 300 μm or more and 600 μm or less to obtain a cobalt ion adsorption material having a particle size of 300 lam or more and 600 μm or less.

Comparative Example 3: Production of Cobalt Ion Adsorption Material (Binder not Used)

400 g of the potassium dititanate powder obtained in Synthesis Example was added to (rehydrated in) 2 L of water to prepare a slurry (form a sludge). This slurry was subjected to wet-grinding twice. The d50 of the potassium hydrogen dititanate hydrate after the wet grinding was 0.98 μm, and x, when the potassium hydrogen dititanate hydrate is represented by the chemical formula $K_{2-x}H_xO \cdot 2TiO_2 \cdot nH_2O$, was 1.0.

Next, the slurry was filtered using a press-type filter to obtain a filtered cake. The obtained filtered cake was granulated using an extrusion machine. The resultant granulated product was sprayed with water in an amount corresponding to 3% by mass of the granulated product, then dried at a temperature of 110° C. for 15 hours, and crushed and sized by a sieve to a particle size range of 150 μm or more and 300 μm or less to obtain a cobalt ion adsorption material having a particle size of 150 μm or more and 300 μm or less.

Comparative Example 4: Production of Cobalt Ion Adsorption Material (Binder not Used)

1200 g of the potassium dititanate powder obtained in Synthesis Example was added to (rehydrated in) 2 L of water to prepare a slurry (form a sludge). This slurry was subjected to wet-grinding twice. The d50 of the potassium hydrogen dititanate hydrate after the wet grinding was 0.69 μm, and x, when the potassium hydrogen dititanate hydrate is represented by the chemical formula $K_{2-x}H_xO \cdot 2TiO_2 \cdot nH_2O$, was 0.6.

Next, the slurry was filtered by vacuum filtration to obtain a filtered cake. The obtained filtered cake was dried at a temperature of 110° C. for 15 hours, and then crushed and sized by a sieve to a particle size range of 300 μm or more and 600 μm or less to obtain a cobalt ion adsorption material having a particle size of 300 μm or more and 600 μm or less.

Comparative Example 5: Production of Cobalt Ion Adsorption Material (Binder not Used)

400 g of the potassium dititanate powder obtained in Synthesis Example was added to (rehydrated in) 2 L of water to prepare a slurry (form a sludge). This slurry was subjected to wet-grinding once. The d50 of the potassium hydrogen dititanate hydrate after the wet grinding was 1.53 μm, and x, when the potassium hydrogen dititanate hydrate is represented by the chemical formula $K_{2-x}H_xO \cdot 2TiO_2 \cdot nH_2O$, was 1.2.

Next, the slurry was filtered and washed using a press-type filter to obtain a filtered cake. The obtained filtered cake was granulated using an extrusion machine, dried at a temperature of 110° C. for 15 hours, and then crushed and sized by a sieve to a particle size range of 150 μm or more and 600 μm or less to obtain a cobalt ion adsorption material having a particle size of 150 μm or more and 600 μm or less.

Comparative Example 6: Production of Potassium Dititanate Particles

The potassium dititanate powder obtained in Synthesis Example was crushed as it is, and then sized by a sieve to a particle size range of 150 μm or more and 600 μm or less to obtain particles having a particle size of 150 μm or more and 600 μm or less.

Comparative Example 7: Production of Particles Containing Potassium Dititanate and Binder 200 g of the potassium dititanate powder obtained in Synthesis Example, 60 g of natural zeolite having an average minor axis length of 1.250 μm and an axial ratio of 1.1 as a binder, and 6 g of polyvinyl alcohol as a granulation aid were mixed, and then rolling granulation was performed while gradually adding 60 g of water. When represented by the chemical formula $K_{2-x}H_xO \cdot 2TiO_2 \cdot nH_2O$, x was 0.1. The granulated product was dried at a temperature of 110° C. for 12 hours, and then sized by a sieve to a particle size range of 300 lam or more and 1000 μm or less. The sized powder was calcined in an electric furnace at a temperature of 630° C. for 5 hours. After calcination, the particles were again sized by a sieve to a particle size range of 300 μm or more and 1000 μm or less to obtain particles having a particle size of 300 μm or more and 1000 μm or less.

Comparative Example 8: Production of Cobalt Ion Adsorption Material 400 g of the potassium dititanate powder obtained in Synthesis Example was added to (rehydrated in) 2 L of water to prepare a slurry (form a sludge). This slurry was subjected to wet-grinding twice. The d50 of the potassium hydrogen dititanate hydrate after the wet grinding was 0.98 μm, and x, when the potassium hydrogen dititanate hydrate is represented by the chemical formula $K_{2-x}H_xO \cdot 2TiO_2 \cdot nH_2O$, was 1.2.

0.4 g of needle-shaped α-type iron oxyhydroxide having an average minor axis length of 0.070 μm and an axial ratio of 10 was added to the wet-ground slurry, and the mixture was stirred and mixed.

Next, the slurry was filtered using a press-type filter to obtain a filtered cake. The obtained filtered cake was granulated using an extrusion machine, dried at a temperature of 110° C. for 15 hours, and then crushed and sized by a sieve to a particle size range of 300 μm or more and 600 μm or less to obtain a cobalt ion adsorption material having a particle size of 300 lam or more and 600 μm or less.

Comparative Example 9: Production of Cobalt Ion Adsorption Material 400 g of the potassium dititanate powder obtained in Synthesis Example was added to (rehydrated in) 2 L of water to prepare a slurry (form a sludge). This slurry was subjected to wet-grinding twice. The d50 of the potassium hydrogen dititanate hydrate after the wet grinding was 0.98 μm, and x, when the potassium hydrogen dititanate hydrate is represented by the chemical formula $K_{2-x}H_xO \cdot 2TiO_2 \cdot nH_2O$, was 1.2.

60 g of needle-shaped α-type iron oxyhydroxide having an average minor axis length of 0.070 μm and an axial ratio of 10 was added to the wet-ground slurry, and the mixture was stirred and mixed.

Next, the slurry was filtered using a press-type filter to obtain a filtered cake. The obtained filtered cake was granulated using an extrusion machine, dried at a temperature of 110° C. for 15 hours, and then crushed and sized by a sieve to a particle size range of 300 μm or more and 600 μm or less to obtain a cobalt ion adsorption material having a particle size of 300 lam or more and 600 μm or less.

[Composition Analysis]

The contents of titanium and potassium in the test sample were measured with an inductively coupled plasma mass spectrometer ICP-Mass (Agilent 7700x ICP-MS, manufactured by Agilent Technologies, Inc.). The molar ratio between potassium and titanium was determined based on the obtained titanium and potassium contents, and from this molar ratio, x in the chemical formula $K_{2-x}H_xO \cdot 2TiO_2 \cdot nH_2O$ was calculated by the following formula.

$x = 2 - 2 \times a$ a: K/Ti molar ratio.

[Measurement of Median Diameter (d50)]

The median diameter (d50) was measured with a laser light diffraction and scattering type particle size analyzer Microtrack MT3300, manufactured by Microtrack Bell Co., Ltd. Ion-exchanged water was used as the dispersion medium. An appropriate amount of the wet grinding slurry was added dropwise into the ultrasonic dispersion tank of the automatic sample circulator attached to the measuring device, and ultrasonic dispersion was then performed at an output of 40 W for 300 seconds. After this, for each measurement parameter, the median diameter (d50) was measured twice by setting the measurement time to 30 seconds, setting a refractive index of the ion-exchanged water to 1.33 and setting a light transmittance of the particle to be measured to absorption. The average value of the two measurements was taken as the median diameter (d50) of the potassium hydrogen dititanate hydrate in the wet grinding slurry.

[Measurement of Average Minor Axis Length and Axial Ratio]

From transmission electron micrographs of each binder, the minor axis length and the major axis length were measured for 50 or more particles using a Carl Zeiss Particle Size Analyzer, and the average minor axis length and the average major axis length were determined. The axial ratio was calculated by dividing the average major axis length by the average minor axis length.

[Evaluation of Primary Particle Leakage]

10 g of each adsorption material particle of each Example and each Comparative Example was weighed and placed into a beaker. 990 g of ion-exchanged water was added, and the mixture was lightly stirred. Then, using a portable turbidity meter TB-31 manufactured by DKK-TOA Corporation, the turbidity of the supernatant was measured to evaluate the primary particle leakage. The turbidity was converted into a kaolin concentration (in which 1000 mg/L of kaolin is 1000 degrees, and 100 mg/L of kaolin is 100 degrees).

[Evaluation of Cobalt Ion Adsorption Performance]

The particulate cobalt ion adsorption materials produced in Examples 1 to 11 and Comparative Examples 1 to 9 were filled in a cylindrical column having an inner diameter of 15.96 mm so as to have a volume of 20 mL and a layer height of 100 mm, respectively. Simulated contaminated water prepared to have common salt of 3 g/kg, cobalt of 1 mg/kg, magnesium of 5 mg/kg, and cesium of 1 mg/kg was passed through each column at a flow rate of 6.5 mL/min (water flow rate 2 m/h, space velocity of 20 $h^{-1}$), the outlet water was regularly collected, and the cobalt concentration in the outlet water was measured using an Agilent 7700x ICP-MS, manufactured by Agilent Technologies, Inc. The liquid temperature of the simulated contaminated water was maintained at 25° C. or higher and 27° C. or lower. The results are shown in Table 1. In Table 1, Bed Volume (hereinafter, referred to as "B.V.") indicates how many times of simulated contaminated water was passed with respect to the volume of the adsorption material. In addition, the breakthrough B.V. indicates the B.V. at the point when a value obtained by dividing the cobalt concentration at the column outlet by the cobalt concentration at the column inlet exceeded 3%.

TABLE 1

| | Adsorption main agent | | Binder | | | | Adsorption material | | Break-through |
|---|---|---|---|---|---|---|---|---|---|
| | $x^{*1}$ | d50 μm | Chemical species | Shape | Minor axis length μm | Axial ratio | Mixing ratio*2 Parts by mass | Particle size μm | Turbidity*3 Degree | B.V. $m^3/m^3$ |
| Example 1 | 1.1 | 0.98 | α-type iron oxyhydroxide | Needle | 0.070 | 10 | 0.5 | 300~600 | 14 | 17880 |
| Example 2 | 1.2 | 0.98 | α-type iron oxyhydroxide | Needle | 0.070 | 10 | 5.0 | 100~600 | 3 | 12600 |
| Example 3 | 0.1 | 0.55 | α-type iron oxyhydroxide | Needle | 0.070 | 10 | 0.5 | 100~600 | 10 | 15850 |

TABLE 1-continued

| | Adsorption main agent | | Binder | | | | Adsorption material | | |
|---|---|---|---|---|---|---|---|---|---|
| | $x^{*1}$ | d50 μm | Chemical species | Shape | Minor axis length μm | Axial ratio | Mixing ratio*2 Parts by mass | Particle size μm | Turbidity*3 Degree | Break-through B.V. $m^3/m^3$ |
| Example 4 | 1.8 | 2.56 | α-type iron oxyhydroxide | Needle | 0.070 | 10 | 7.0 | 300~600 | 2 | 12190 |
| Example 5 | 1.0 | 0.98 | γ-type iron oxyhydroxide | Needle | 0.070 | 30 | 0.5 | 150~300 | 13 | 18290 |
| Example 6 | 0.6 | 0.69 | γ-type iron oxyhydroxide | Needle | 0.070 | 30 | 5.0 | 300~1000 | 3 | 15040 |
| Example 7 | 1.2 | 0.98 | Rutile-type titanium dioxide | Spindle- | 0.025 | 4 | 5.0 | 100~600 | 3 | 12190 |
| Example 8 | 1.2 | 1.53 | Titanium oxyhydroxide | Strip | 0.035 | 3 | 3.0 | 300~600 | 6 | 16250 |
| Example 9 | 1.1 | 0.98 | α-type diiron trioxide | Needle | 0.070 | 10 | 1.0 | 300~600 | 12 | 17470 |
| Example 10 | 1.1 | 0.98 | Triiron tetraoxide | Thin-plate | 0.200 | 80 | 5.0 | 300~600 | 10 | 17070 |
| Example 11 | 1.1 | 0.98 | Magnesium ferrite | Needle | 0.200 | 5 | 3.0 | 300~600 | 8 | 17470 |
| Comparative Example 1 | 1.1 | 0.98 | — | — | — | — | — | 300~600 | 190 | 17820 |
| Comparative Example 2 | 1.2 | 0.98 | — | — | — | — | — | 300~600 | 170 | 12960 |
| Comparative Example 3 | 1.0 | 0.98 | — | — | — | — | — | 150~300 | 160 | 17820 |
| Comparative Example 4 | 0.6 | 0.69 | — | — | — | — | — | 300~600 | 150 | 15390 |
| Comparative Example 5 | 1.2 | 1.53 | — | — | — | — | — | 150~600 | 180 | 16200 |
| Comparative Example 6 | 0.0 | — | — | — | — | — | — | 150~600 | 360 | Measurement not possible |
| Comparative Example 7 | 0.1 | — | Zeolite | Particle | 1.250 | 1.1 | 30.0 | 300~1000 | 2 | 1950 |
| Comparative Example 8 | 1.2 | 0.98 | α-type iron oxyhydroxide | Needle | 0.070 | 10 | 0.1 | 300~600 | 100 | 13000 |
| Comparative Example 9 | 1.2 | 0.98 | α-type iron oxyhydroxide | Needle | 0.070 | 10 | 15.0 | 300~600 | 2 | 10970 |

*1 Indicating x in the chemical formula $K_{2-x}H_xO \cdot 2TiO_2 \cdot nH_2O$.
*2 Indicating the mixing ratio with respect to 100 parts by mass of cobalt ion adsorption main agent.
*3 Indicating turbidity converted into a kaolin concentration. 1000 degrees (1000 mg/L of kaolin), 100 degrees (100 mg/L of kaolin).

From Table 1, it can be seen that Examples 1 to 11 have lower turbidity than Comparative Examples 1 to 6, in which no binder was added, and that the primary particles are less likely to fall off. Moreover, it can be seen that Examples 1 to 11 have substantially the same cobalt ion adsorption performance as Comparative Examples 1 to 5, which did not have a binder. In Comparative Example 6, the adsorption material particle broke apart in the column, and it was thus difficult for the aqueous solution to flow, and a breakthrough B.V. could not be measured.

If the turbidity measured under the evaluation conditions shown in Table 1 exceeds 50 degrees, the strainer will be blocked during use, hindering smooth treatment of the contaminated water. Moreover, measures to prevent particles that have fallen off during use or during a replacement operation of the adsorption material after use from being dispersed into the environment are required, causing costs to increase. Therefore, a turbidity exceeding 50 degrees is not suitable for practical use. In addition, if the breakthrough B.V. measured under this conditions is less than 12000 ($m^3/m^3$), the replacement frequency of the adsorption material increases, the effective processing capacity of the adsorption device decreases, and the risk of radiation exposure during a replacement operation increases, and thus such a breakthrough B.V. is not suitable for practical use. In all of the comparative examples, the turbidity or breakthrough B.V. falls into the above, so it cannot be said that the comparative examples are practical as an adsorption material. On the other hand, in Examples 1 to 11, the turbidity was sufficiently smaller than 50 degrees, and the breakthrough B.V. was 12000 ($m^3/m^3$) or more, and therefore it can be said that Examples 1 to 11 are practical as an adsorption material.

The adsorption material of the present invention has a large adsorption capacity, and therefore the replacement frequency can be reduced. Further, since the primary particles are less likely to fall off during use, the amount of fine powder generated is small, and the cobalt-containing water treatment apparatus is less likely to become blocked. It can be said that such features of the adsorption material of the present invention are particularly effective when used for removing radioactive cobalt ions.

The invention claimed is:

1. A particulate cobalt ion adsorption material comprising 0.3 parts by mass or more and 8.0 parts by mass or less of a binder consisting of fine particles of a water-insoluble metal oxide or metal hydroxide with respect to 100 parts by mass of a cobalt ion adsorption main agent consisting of potassium hydrogen dititanate hydrate, wherein the particulate cobalt ion adsorption material has a particle size of 100 μm or more and 1000 μm or less.

2. The cobalt ion adsorption material according to claim 1, wherein the potassium hydrogen dititanate hydrate is represented by the chemical formula $K_{2-x}H_xO \cdot 2TiO_2 \cdot nH_2O$ (wherein, x is 0.1 or more and 1.8 or less, and n is greater than 0), and the potassium hydrogen dititanate hydrate has a median diameter of 0.5 μm or more and 3.0 μm or less.

3. The cobalt ion adsorption material according to claim 1, wherein the fine particles of the water-insoluble metal oxide or metal hydroxide has an average minor axis length of 0.01 μm or more and 0.30 μm or less.

4. The cobalt ion adsorption material according to claim 1, wherein the fine particles of the water-insoluble metal oxide or metal hydroxide has shape anisotropy, and an axial ratio obtained by dividing an average major axis length by an average minor axis length of 3 or more and 100 or less.

5. A method for producing the particulate cobalt ion adsorption material according to claim 1, the method comprising:

hydrating potassium dititanate represented by the chemical formula $K_2O \cdot 2TiO_2$ and performing cation exchange between potassium ions ($K^+$) and protons ($H^+$) to obtain a potassium hydrogen dititanate hydrate represented by the chemical formula $K_{2-x}H_xO \cdot 2TiO_2 \cdot nH_2O$ (wherein, x is 0.1 or more and 1.8 or less, and n is greater than 0); and adding, as a binder, 0.3 parts by mass or more and 8.0 parts by mass or less of fine particles of the water-insoluble metal oxide or metal hydroxide and has shape anisotropy with respect to 100 parts by mass of potassium hydrogen dititanate hydrate to perform granulation.

6. The method according to claim 5, comprising the steps of:
(1) mixing a titanium source and a potassium source;
(2) calcining the obtained mixture to obtain potassium dititanate;
(3) bringing the potassium dititanate into contact with water to form a slurry, and hydrating the potassium dititanate to perform cation exchange between potassium ions and protons to obtain the potassium hydrogen dititanate hydrate ($K_{2-x}H_xO \cdot 2TiO_2 \cdot nH_2O$, wherein x is 0.1 or more and 1.8 or less, and n is greater than 0);
(4) wet-grinding the obtained potassium hydrogen dititanate hydrate ($K_{2-x}H_xO \cdot 2TiO_2 \cdot nH_2O$, wherein x is 0.1 or more and 1.8 or less, and n is greater than 0) in a slurry;
(5) adding the fine particles of the water-insoluble metal oxide or metal hydroxide as the binder to the slurry so that a concentration of the binder becomes 0.3 parts by mass or more and 8.0 parts by mass or less with respect to 100 parts by mass of the potassium hydrogen dititanate hydrate, stirring, and mixing;
(6) subjecting the slurry to solid-liquid separation to obtain a filtered cake including the potassium hydrogen dititanate hydrate and the bindier;
(7) granulating the filtered cake;
(8) drying the particles obtained by granulation at a temperature of 60° C. or higher and 150° C. or lower for 1 hour or more and 24 hours or less; and
(9) crushing and sizing the dried granulated particles to obtain a particulate cobalt ion adsorption material having a particle size range of 100 μm or more and 1000 μm or less.

* * * * *